United States Patent [19]
Legros et al.

[11] Patent Number: 5,809,664
[45] Date of Patent: Sep. 22, 1998

[54] SPOUT-FLUID BED DRYER AND GRANULATOR FOR THE TREATMENT OF ANIMAL MANURE

[75] Inventors: Robert Legros, Pincourt; Jamal Chaouki, Pointe-Claire; Xiao Tao Bi; Arturo Macchi, both of Montreal; Kébir Ratnani, Boucherville, all of Canada

[73] Assignee: Société en Commandite Gaz Métropolitain, Montreal, Canada

[21] Appl. No.: 751,025

[22] Filed: Nov. 15, 1996

[30] Foreign Application Priority Data

Jun. 7, 1996 [CA] Canada ................................ 2178575

[51] Int. Cl.⁶ ......................................... F26B 3/00
[52] U.S. Cl. ........................... 34/347; 34/147; 34/170; 159/4.01; 159/4.02; 159/44; 159/47.3; 159/48.1; 159/901; 159/DIG. 3
[58] Field of Search ................... 34/329, 338, 345, 34/347, 360, 372, 373, 60, 135, 141, 147, 168, 169, 170, 181, 182; 159/4.01, 4.02, 4.04, 4.07, 4.1, 4.2, 48.1, 901, 44, 47.3; 203/40; 432/15; 110/245

[56] References Cited

U.S. PATENT DOCUMENTS

| | | |
|---|---|---|
| 1,325,294 | 12/1919 | Glorioso . |
| 2,000,299 | 4/1935 | Huttlin . |
| 2,085,583 | 12/1937 | Bernes . |
| 4,226,668 | 10/1980 | Ferguson .............................. 159/4.06 X |
| 4,429,643 | 2/1984 | Mulholland ............................... 110/238 |
| 4,644,665 | 2/1987 | Naunapper et al. ................... 34/360 X |
| 5,010,830 | 4/1991 | Asuka et al. .............................. 110/347 |
| 5,248,387 | 9/1993 | Hansen .................................... 159/48.1 |
| 5,386,974 | 2/1995 | Hardie et al. ............................ 266/157 |
| 5,557,873 | 9/1996 | Lyman et al. .............................. 34/379 |
| 5,607,649 | 3/1997 | Hansen .................................. 34/360 X |
| 5,632,100 | 5/1997 | Hansen ..................................... 34/374 |

OTHER PUBLICATIONS

"Drying Principles, Heat and Mass Balances, Thermal Efficiency", Chapter 3, pp. 77 to 109; Chapter 8, pp. 299 to 342.
Hydrodynamic Characteristics of Jet–Spouted Beds, Canadian Journal of Chemical Engineering, vol. 61, Jun. 1983, pp. 377–381; A. Markowski and W. Kaminski.
Particle Velocity and Solids Circulation Rate in a Jet–Spouted Bed, Canadian Journal Chemical Engineering, vol. 70, Oct. 1992, Osamu Uemaki and Toshiro Tsuji.

*Primary Examiner*—Henry A. Bennett
*Assistant Examiner*—Steve Gravini

[57] ABSTRACT

A spout-fluid bed drying system and process is comprised of a spout-fluid bed dryer having a conical shaped lower section provided with a packing of heat exchange particles. A cyclone separator is connected to the top of the dryer with separated particles collected by a receiver connected to the leg of the cyclone. A vapor fan compresses the air-vapor mixture before it goes to the heat recuperator and mixing chamber. A tube-shell type heat exchanger, wherein effluent gases from the vapor fan are preheated with heat exchange with the outcoming high temperature gases. A combustion and incineration chamber wherein a natural gas burner is installed at the top and the high temperature flame is used to incinerate the effluent gases introduced from the annulus channel of the chamber to have the odors and VOCs destroyed. A mixing chamber wherein high temperature stream from the incineration chamber is mixed with low temperature stream from the vapor fan to serve as the drying media with the temperature maintained at around 400° C. A slurry discharge nozzle is disposed below the packing and connected to a slurry container via piping and a slurry pump for releasing slurry to the surface of the particles within the packing. Evaporation of water occurs mostly on the surface of particles by contact with hot drying media. A gas-air mixture is fed to the burner through a feed pipe line wherein fresh air is supplied from an air blower.

25 Claims, 2 Drawing Sheets

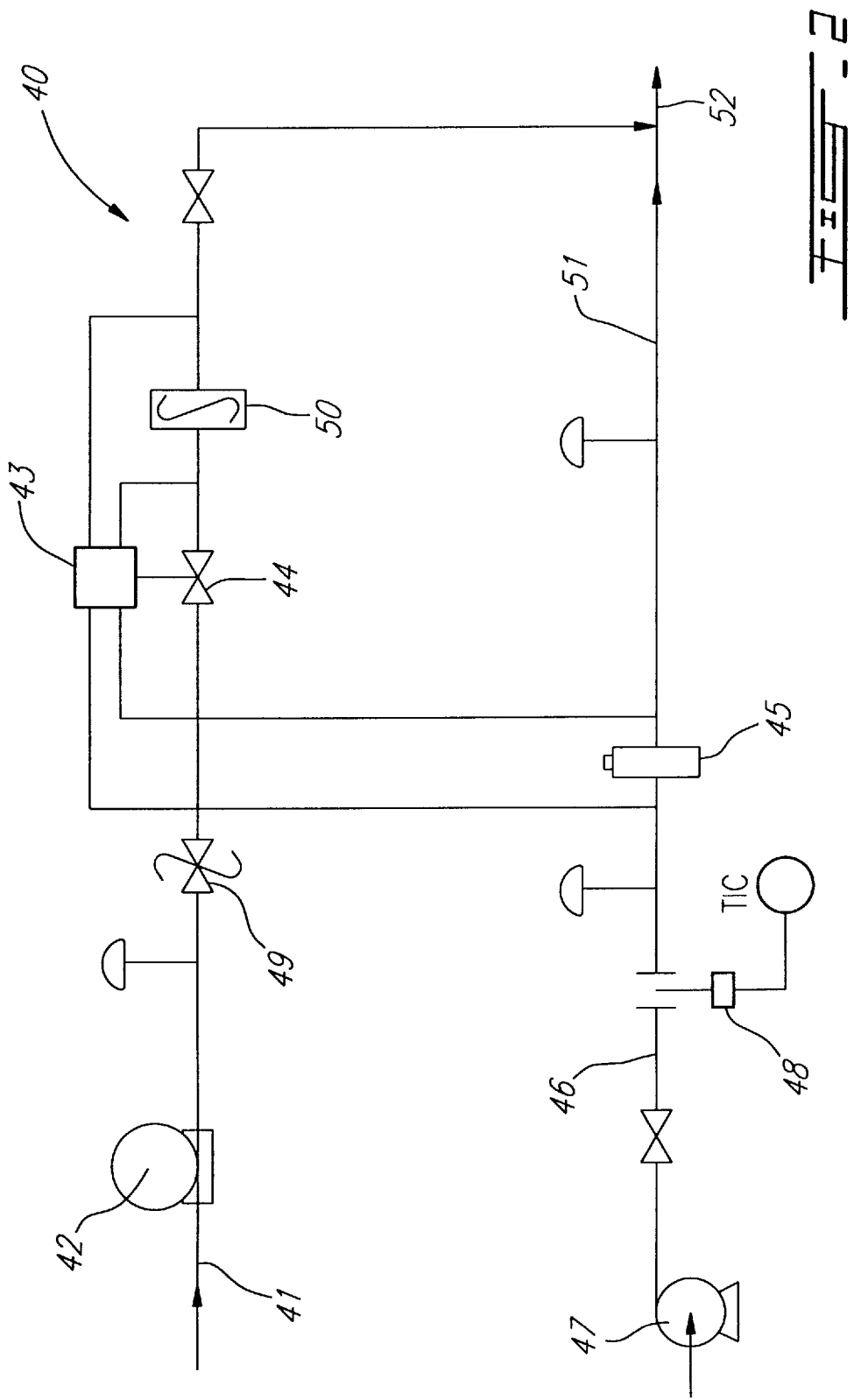

SPOUT-FLUID BED DRYER AND GRANULATOR FOR THE TREATMENT OF ANIMAL MANURE

TECHNICAL FIELD

The present invention relates to an integrated drying and incineration system and process wherein organic refuse material, such as animal manure, animal excreta, slaughterhouse slurry or other related slurry solution is dried by direct contact with hot air in a spout-fluid bed of conical shape packed with heat exchange particles, and wherein the generated effluent gases are incinerated in a combustion chamber to have the volatile organic compounds (VOCs) and odor gases destroyed.

BACKGROUND ART

Animal manure and other related sewage slurries from animal farms need to be treated before being released to the land field to prevent the contamination of the underground water system and the spreading of diseases related to bacteria contained in the manure slurry. There exist two competitive types of processes for the treatment of manure slurry. The first type of process treats the slurry biologically in which the waste solution is digested via aerobic or anaerobic fermentation, then the treated slurry which has a water content around 80% is either applied to the land field, or further treated to reduce water content to about 10% and then used as fertilizers. The other type of process uses physical operations to treat the slurry in which the slurry is dried by direct or indirect contact with hot air or gas stream to evaporate the water, the generated solids have a moisture content of about 10% and can be used as fertilizers. The generated gas-vapor mixture is further treated to remove organic compounds and odor gases via incineration or wet scrubbing before it is released to the environment. In recent years, the amount of biologically digested sludge to be spread on the land field has been greatly limited due to the more strict regulations on environmental protection. Most of the digested slurry thus needs to be treated more thoroughly to remove naturally undegradable pollutants or to remove water to such a level that the solids sludge can be used as substitute fertilizers. As a result, the direct drying and granulation process becomes economically advantageous over the biological treatment process.

There exist several possible processes for the drying of animal manure slurry, such as the spray drying process described by Masters, K. (1972), "Spray drying", Leonard Hill Books, London; rotary drying process described by Glorioso (1993) in Canadian Patent 1,325,583; traveling grate drying process described by Bernes and Jensen (1991) in Canadian Patent 2,085,583; and fluidized bed dryer as described by Huttlin (1991) in Canadian Patent 2,000,299. To reduce the sludge water content from 90% to less than 10%, extensive evaporation is involved which requires high heat and mass transfer rates. Compared to rotary dryers and traveling grant dryers, a fluidized bed in which slurry is sprayed on the bed material and evaporation occurs on the surface of particles can provide much larger surface area for the heat and mass transfer, leading to much higher overall mass and heat transfer rates. The gas-solids contact can be further improved in a spout-fluid bed due to the high internal solids circulation inside the spout-fluid bed (Uemaki, O. and Tsuji, T., "Particle velocity and solids circulation rate in a jet-spouted bed", Can. J. Chem. Eng., 70, 925–928, 1992). As a result, spout-fluid bed dryers can provide a drying efficiency more than 10 times higher than spray dryers (Masters 1972; Markowski, A. and Kaminski, W., "Hydrodynamic characteristics of jet-spouted beds", Can. J. Chem. Eng., 61, 377–3811, 1983).

SUMMARY OF INVENTION

There exists a need to develop a process to dry animal manure which is much more efficient than the prior art and which can destroy generated VOCs and odor gases at higher levels than previously achieved by the above referred-to drying processes and wherein the treatment capacity can be increased and further wherein the effluent gas is incinerated in a combustion chamber which also provides the hot air for the drying chamber.

It is therefore a feature of the present invention to provide a spout-fluid bed dryer and a recuperative type combustion chamber which provide the above need.

According to a further feature of the present invention there is provided an organic refuse material drying system employing a spout-fluid bed of conical shape to enhance mass transfer rate and loading capacity by increasing internal solids circulation.

Another feature of the present invention is to provide an organic refuse material drying system employing a spout-fluid bed wherein the temperature is maintained at about 120° C. to destroy all infectious bacteria contained in the dried solids.

Another feature of the present invention is to provide an organic refuse material drying system employing a gas-fired incinerator wherein the generated VOC vapors and odor gases are destroyed to prevent air pollution.

Another feature of the present invention is to provide an organic refuse material drying system employing a heat recuperator wherein the high temperature combustion gases is used to preheat the effluent gases from the drying chamber to incineration chamber.

Another feature of the present invention is to provide an organic refuse material drying system employing a spout-fluid bed dryer wherein the slurry solution is sprayed from either the top, the bottom or the side walls into the bed material by atomizing nozzles, although other atomizing devices are also workable, to promote intimate contact between liquid drops, solids particles and drying gases.

A still further feature of the invention is to provide an improved method of treating organic refuse material slurry having fertilizing properties to produce non-polluting dried manure.

Another feature of the present invention is to provide an optional feeder which can add nutriments to the drying system to improve the fertilizer quality of the dried slurry particles.

Another feature of the present invention is to provide an organic refuse material drying system which produces no liquid effluent which necessitates further treatment.

According to the above features, from a broad aspect, the present invention provides an integrated and high efficiency organic refuse material drying system and method which comprise a spout-fluid bed dryer of conical shape having heat exchange particles at the bottom thereof and a liquid atomizing device connected to the top, the bottom or the side walls, and a combustion and incineration chamber having one heat recuperator.

According to a further broad aspect of the present invention there is provided a drying system for drying organic refuse material having fertilizing properties and which comprises a spout fluid-bed dryer housing having a conical section provided in at least a part thereof with a packing of heat exchange particles. Means is provided to feed a fine spray of an organic refuse material slurry to the packing. Inlet means is provided at a narrowed end of the conical section to admit a hot drying gas stream into the housing to heat the packing and to dry the slurry to produce dried slurry particles. The dried slurry particles are convected to a separation means where the dried slurry particles are separated. The effluent gases are fed to a combustion chamber for destroying volatile organic compounds and odor gases from the effluent gases before releasing a regulated amount of the treated gases which is now clean hot gases and for further heating and drying the gas stream to feed the inlet means of the dryer housing.

According to a still further broad aspect of the present invention there is provided a method of treating an organic refuse slurry having fertilizing properties to produce dried for fertilizing particles and for destroying volatile organic compounds and odor gases contained in the manure slurry. The method comprises the steps of disposing a packing of heat exchange particles in a conical section of a fluid-bed dryer housing having a feed port at a narrowed end. The packing is heated to a predetermined temperature range by passing a hot drying gas stream therethrough from the narrowed end. A fine spray of an organic refuse slurry is fed to the packing. The fine spray is dried by evaporating its water content by contact with the heat exchange bodies and hot drying gas stream whereby to produce dried slurry particles and effluent gases. The dried slurry particles are convected to a particle separator for the extraction of the dried slurry particles. The effluent gases are convected to a combustion and incineration chamber for removing volatile organic compounds and odor gases therefrom and for releasing a regulated amount of hot treated gases into the atmosphere and to further heat the air to produce the hot drying gas stream to feed the narrowed end of the dryer housing.

BRIEF DESCRIPTION OF DRAWINGS

A preferred embodiment of the present invention will now be described with reference to the accompanying drawings in which:

FIG. 2 is a simplified schematic diagram showing the gas and air feed lines connected to the gas burner.

DESCRIPTION OF PREFERRED EMBODIMENTS

Figure 1:
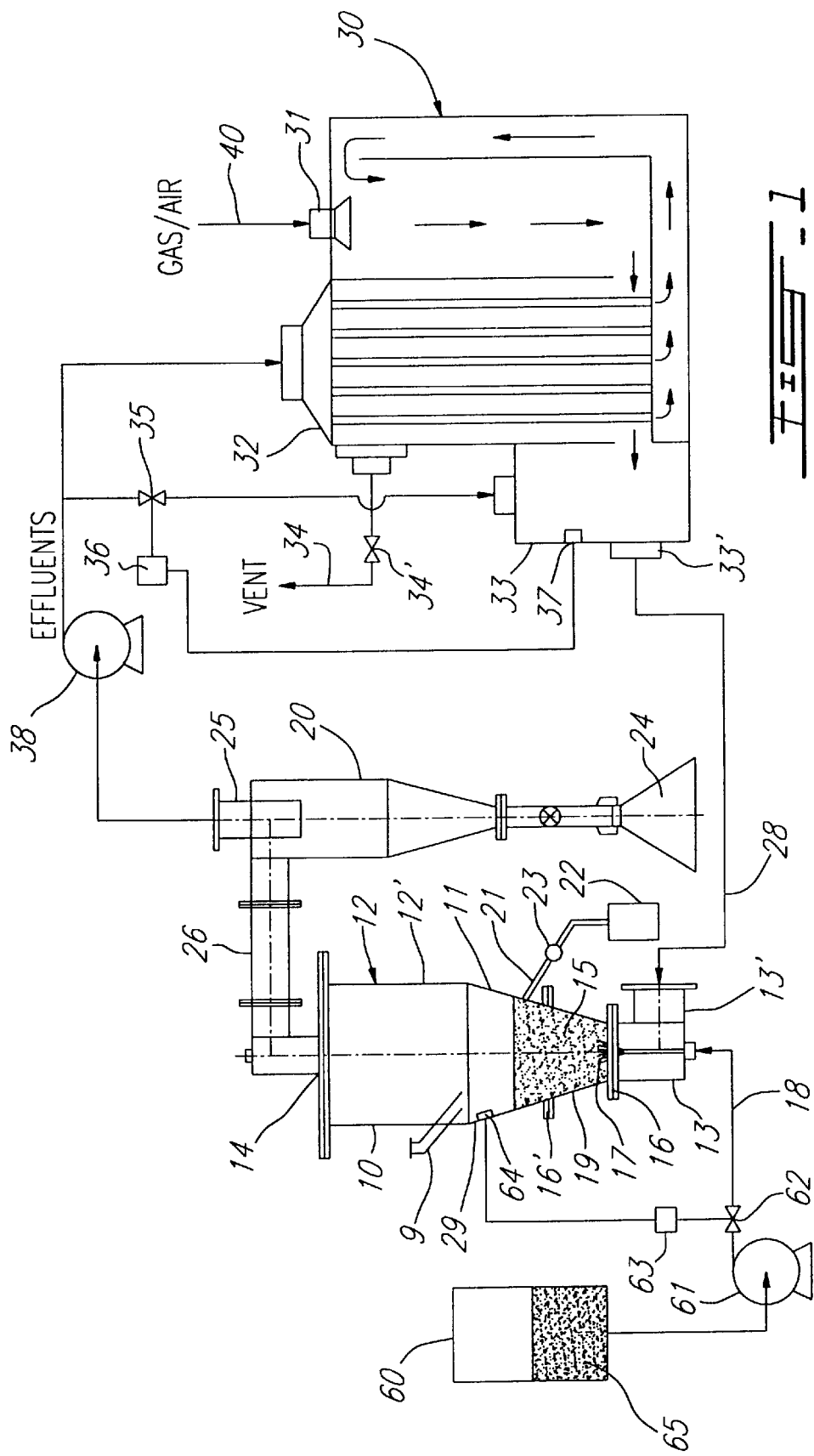
FIG. 1 is a schematic diagram showing the process of the present invention consisting of a spout-fluid bed dryer, a chamber for combustion, incineration and heat recuperation, a slurry feed circuit and the interconnecting pipe lines.

Referring now to the drawings and more particularly to FIG. 1, there is shown generally at 10, the spout-fluid bed dryer of the present invention for producing dried fertilizer from organic refuse material having fertilizing properties. As can be seen it consists of a conical shape vertical housing 12 of circular cross-section, although other cross-sectional shapes are workable, and defining a circumferential side wall 12, a conical bottom chamber 11, an open bottom end 13 and a top end 14.

A packing 15 of particles is supported by a perforated distributor 16 in the conical section 11, although other types of distributors are workable, permitting the passage of air through the packing and from the bottom of the housing. A slurry discharge means in the form of spray nozzles 17, although other spray means are workable, is disposed below the packing 15, although it can also be mounted at the top or on the side walls of the housing, and connected to a pressure supply line 18 whereby to discharge slurry solution to the packing 15 for the evaporation of water within the housing conical section 11.

A distinct aspect of the design of this drying chamber is the use of a conical shape chamber 11 which promotes internal solids circulation and mixing, and thus prevents particles from sticking together at high slurry loading rates.

Another distinct aspect of the design of this conical chamber 11 is the division of the chamber into a lower section 19 and an upper section 29. With a distributor 16 located at the bottom of the lower section 19 and particle packing 15 above the distributor 16, the spout-fluid bed is operated in a jet-spouting mode which generates strong internal solids circulation and thus provide high gas and solids contacting. This enhances the evaporation of water and, on the other hand, promotes the breakup of formed film layers on the surface of particles from the deposition of slurry liquid. As a result, fine particles are generated continuously from this particle packing 15 and are elutriated by the air-vapor mixture to the top of the chamber and out of the chamber to the cyclone separator 20.

When the distributor 16' is located at the bottom of the upper section 29 of the chamber 11 and particle packing 15 is above the distributor 16', the bed is operated in a spout-fluidized bed mode with reduced internal solids circulation rate. As a result, the size of particles will grow up during the drying process due to the deposition of layers by layers of fine powders from the evaporation of slurry films sprayed to the particle surface. The drying chamber in such a case serves as both a dryer and a granulator. The generated large sludge particles may then be discharged continuously from the side wall of the housing through an inclined pipe 21 and directed to a receiver 22. The discharge rate may be controlled by a ball valve 23.

In the operation, the hot drying air is supplied to the bottom of the dryer from a pipe line 28, which connects a port 13' at the bottom end 13 of the dryer 10 to the outlet 33' of the mixing chamber 33 which will be described later. The slurry 65 is supplied to the spray nozzles 17 through a pipe line 18, which is connected to a slurry pump 61 and a slurry tank 60 with the flow rate of the slurry controlled by a controllable valve 62 and a modulating controller 63 responsive to the temperature of the drying chamber 11, and which temperature is measured by thermocouples 64.

The sprayed slurry forms a thin film on the surface of particles within the packing 15 and water evaporation is realized by both the release of heat from the heated particles and from the contact with the hot drying air. The air and vapor mixture and elutriated particles rise up with the air current and leave the drying chamber from the top port 14, and are directed to a cyclone 20 wherein entrained dry particles are separated from the gas stream and collected from the bottom of the cyclone by a receiver 24. Effluent air and vapor stream leaves the cyclone from the top port 25 and are convected to an incinerator chamber 30, which will be described later with reference to FIG. 2, to have the VOCs and odors destroyed.

A nutriment feed pipe 9 may also be positioned above the packing 15 to introduce into the housing 12 nutriments for admixture to the dried slurry particles to improve the fertilizing quality of the dried manure collected by the cyclone separator 20.

The proper evaporation of slurry in the drying chamber 11 is monitored by regulating the feeding rate of the slurry based on temperature within the particle layers of the packing 15 and the top freeboard region by using a series of thermocouples, although it is also workable to adjust the feeding rate of the drying air. The condensation of vapor in the connecting pipe line 26 is prevented by monitoring the temperature within the cyclone 20 to be higher than the dew point of the mixture by a thermocouple (not shown).

The combustion and incineration chamber 30 shown in FIG. 1 is provided with a natural gas burner 31, a heat recuperator 32 and a mixing chamber 33. The natural gas, or other fuels, together with the combustion air, is supplied from a pipe line 40 which will be described in detail later with reference to FIG. 2, to the burner 31 for the combustion. High temperature combustion gases then meets with the effluent gases which come from the drying chamber 11, compressed by a vapor fan 38 and fed into the combustion and incineration chamber 30 before preheated in a tube-shell type heat exchanger 32. To ensure complete removal of VOCs and odors contained in the effluent gases, the temperature of the incineration chamber is maintained above 750° C. and the effluent gas stream has a residence time longer than 0.5 second. After passing the incineration chamber, one stream of the effluent gases goes into the shell side of the heat exchanger 32 to preheat the incoming effluent gases from the vapor fan 38 before it leaves the system through vent 34 at a temperature lower than 350° C. A valve 34' controls the discharge of the treated gases and balances the system. The vent 34 could be convected to heat exchange devices to extract heat therefrom for other uses. The other stream of the effluent gases is passed to a mixing chamber 33 to be mixed with another stream directly from the exit of the vapor fan 38. With the two streams well mixed in the mixing chamber, the mixture at a temperature of around 400° C. goes to the bottom of the drying chamber 11 for the drying of the slurry solution 65. To control the temperature of mixture going to the mixing chamber 33, a controllable valve 35 is installed in the effluent air line with the flow rate controlled by a modulating controller 36 based on the temperature inside the mixing chamber 33 measured by a thermocouple 37. As can be seen the blower 38 convects the drying air flow and effluents in a closed loop from the top of the housing 12 to the bottom port 13', through the mixing chamber 33.

The distinct feature of such a combination of combustion-incineration-recuperation chamber is the energy saving. The combustion of natural gas in a single chamber provides energy for the preheating of incoming effluent gases, the incineration of effluent gases and provides moderate temperature gases for the drying chamber 11. Although only one heat recuperator is included in this diagram, it is also workable to have more heat exchangers to further recuperate energy from the down stream venting to the environment.

FIG. 2 is a block diagram illustrating a typical configuration of the gas-air feed circuit 40. As herein shown a natural gas feed line 41 is connected to a pressure regulator 42 and feeds a modulating controller 43 connected to a controllable valve 44. Modulating controller 43 is also connected across the orifice 45 of an air pressure line 46 fed by a blower 47. The line is connected to an air valve 48 and also directly to the orifice 45. An electrovalve 49 is connected upstream of the controlled valve 44 and an adjustable orifice 50. The controlled valve 44 is controlled by the modulating controller which senses the amount of air being supplied in the feed line 51 so that a constant gas-air mixture may be fed to its outlet 52 which is connected to the feed pipe 40 of the burner 31. This feed circuit is substantially of standard design.

Although in the present application reference is made particularly to the treatment of animal manure, it is to be understood that the invention should not be restricted thereto. In fact, dried fertilizers produced from suitable organic refuse material having fertilizing properties and to which nutriments may or may not be added is intended to be covered. For example, slurry from slaughterhouses, municipal slurry obtained from refuse dumps, human or industrial slurries or alimentary slurries are examples of organic refuse capable of being treated by the system and method of this invention.

It is within the ambit of the present invention to cover any obvious modifications of the preferred embodiment described herein, providing such modifications fall within the scope of the appended claims.

We claim:

1. A drying system for drying organic refuse material having fertilizing properties, said system comprising a spout fluid-bed dryer housing having a conical section provided in at least a part thereof with a packing of heat exchange particles, means to feed a fine spray of an organic refuse material slurry to said packing, inlet means at a narrowed end of said conical section to admit a hot drying gas stream into said housing to heat said packing and to dry said slurry to produce dried slurry particles, said dried slurry particles being convected to a separation means where said dried slurry particles are separated, said effluent gases being fed to a combustion chamber for destroying volatile organic compounds and odor gases from said effluent gases before releasing a regulated amount of the treated gases which is now clean gases and for further heating and drying said gas stream to feed said inlet means of said dryer housing.

2. A drying system as claimed in claim 1 wherein said organic refuse material is animal manure, said slurry being a manure slurry.

3. A drying system as claimed in claim 2 wherein said combustion chamber is provided with a fuel burner.

4. A drying system as claimed in claim 2 wherein said separation means is a cyclone separator to extract said dried slurry particles from said effluent gases to provide a solid fertilizer from said manure slurry and which is substantially free of volatile organic compounds and odor gases.

5. A drying system as claimed in claim 2 wherein said packing of heat exchange particles is supported in a bottom end portion of said conical section on a perforated distributor plate member and through which said hot drying gas stream passes.

6. A drying drying system as claimed in claim 5 wherein said means to feed a fine spray of a manure slurry is provided by one or more spray nozzles operating in a jet-spouting mode and oriented at a bottom end of said packing to release said fine spray into said packing for drying of said fine spray particles by contact with said heat exchange particles and/or hot drying gas stream.

7. A drying system as claimed in claim 6 wherein said hot drying gas stream is an air-vapor mixture.

8. A drying system as claimed in claim 2 wherein said packing of heat exchange particles is supported in an upper end portion of said conical section on a perforated distributor plate member and through which said hot drying gas stream passes.

9. A drying system as claimed in claim 8 wherein said means to feed a fine spray of a manure slurry is provided by spray means oriented to release a fine particle spray of said slurry on said heat exchange particles whereby said slurry will build-up on said heat exchange particles as it dries up to produce large solid sludge particles which are discharged through discharge means in a side wall of said housing and conveyed to a receiver means by gravity through a conduit having discharge rate control means.

10. A drying system as claimed in claim 3 wherein said combustion chamber has a combustion section into which said effluent gases are released to destroy volatile organic compounds and odor gases from said effluent gases whereby to produce high temperature combustion gases, a natural gas burner, and a heat recuperator section where a controlled amount of said high temperature combustion gases may be vented or convected for secondary use.

11. A drying system as claimed in claim 10 wherein said combustion chamber is further provided with a mixing chamber adjacent an outlet thereof, an effluent gas inlet port connected to said mixing chamber for admitting a regulated flow of said effluent gases therein for admixture with said high temperature combustion gases to treat at least part of said air prior to convecting same to said housing to heat said packing.

12. A drying system as claimed in claim 11 wherein said combustion chamber is provided with convection pipes extending from an inlet end of said chamber through said heat recuperator section to further heat said high temperature combustion gases, said combustion pipes being connected at an outlet end to a conduit means to release said effluent gases into said combustion section.

13. A drying system as claimed in claim 11 wherein said regulated flow of said effluent gases is provided by a controllable valve and a modulating controller device, said controller device being fed signals by a thermocouple sensing the temperature inside said mixing chamber whereby to control the flow rate of said effluent gases as a function of said temperature.

14. A drying system as claimed in claim 2 wherein said means to feed a fine spray of manure slurry is comprised by a slurry holding tank, a feed conduit, and a slurry pump in said feed conduit; said feed conduit being connected to supply atomizing spray nozzles associated with said packing, and control means to control the flow rate slurry.

15. A drying system as claimed in claim 14 wherein said control means comprises a modulating controller regulating a controllable valve connected in said feed conduit, a thermocouple connected in said housing above said packing for sensing the temperature in said housing a feeding temperature responsive signals to said controller.

16. A drying system as claimed in claim 2 wherein said packing is maintained at a temperature of at least 120° C. by said hot drying gas whereby to destroy infectious bacteria contained in said dried slurry particles.

17. A drying system as claimed in claim 2 wherein said combustion chamber is a catalytic combustion chamber or an incineration chamber.

18. A drying system as claimed in claim 2 wherein there is further provided a feeder inlet to introduce into said fluid bed dryer housing nutriments for admixture to said dried slurry particles whereby to improve the fertilizing quality of said slurry particles for use as dried manure fertilizer.

19. A method of treating an organic refuse slurry having fertilizing properties to produce a dried fertilizing particles and for destroying volatile organic compounds and odor gases contained in said organic refuse slurry, said method comprising the steps of:

i) disposing a packing of heat exchange particles in a conical section of a feed port at a narrowed end, ii) heating said packing to a predetermined temperature range by passing a hot drying gas stream therethrough from said narrowed end, iii) feeding a fine spray of an organic refuse slurry to said packing, iv) drying said fine spray by evaporating its water content by contact with said heat exchange bodies and hot drying gas stream, to produce dried slurry particles and effluent gases, v) convecting said dried slurry particles to a particle separator for the extraction of said dried slurry particles, vi) convecting said effluent gases to a combustion chamber for removing volatile organic compounds and odor gases therefrom to produce hot air and for releasing a regulated amount of hot treated gases into the atmosphere and to further heat said air to provide said hot drying gas stream to feed said narrowed end of said dryer.

20. A method as claimed in claim 19 wherein said step (iii) comprises monitoring the temperature within said housing to control a controllable valve in a feed conduit to regulate the flow rate of organic refuse slurry.

21. A method as claimed in claim 19 wherein said step (vi) further comprises mixing in an outlet portion of said incineration chamber heated and unpolluted air from said combustion chamber with a regulated quantity of said effluent gases to provide a dryer gas stream.

22. A method as claimed in claim 19 wherein said step (vi) further comprises convecting said effluent gases in conduit means in said combustion chamber, and feeding said heated and unpolluted air in contact with said conduit means to preheat said effluent gas prior to releasing same in said combustion chamber.

23. A method as claimed in claim 19 wherein said step (v) comprises convecting said dried slurry particles and said effluent gases to a cyclone solid particle extractor for the removal and collection of said dried slurry particles to produce said fertilizer therefrom.

24. A method as claimed in claim 19 wherein said step (vi) further comprises burning a natural gas and air mixture in said combustion chamber to maintain the temperature therein above 750° C., and convecting said effluent gases therein for a residence time of at least 0.5 second.

25. A method as claimed in claim 19 wherein there is further provided the step of introducing in said fluid-bed drier nutriments for admixture with said dried slurry particles to improve the fertilizing quality of said slurry particles for use as a dried manure fertilizer.

* * * * *